(12) United States Patent
Nakanishi et al.

(10) Patent No.: US 6,753,805 B2
(45) Date of Patent: Jun. 22, 2004

(54) RADAR SYSTEM

(75) Inventors: Motoi Nakanishi, Nagaokakyo (JP); Toru Ishii, Hirakata (JP); Tetsu Nishimura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/310,807

(22) Filed: Dec. 6, 2002

(65) Prior Publication Data

US 2003/0117312 A1 Jun. 26, 2003

(30) Foreign Application Priority Data

Dec. 13, 2001 (JP) ........................................ 2001-380593

(51) Int. Cl.⁷ .............................................. G01S 13/34
(52) U.S. Cl. .................... 342/128; 342/70; 342/109; 342/145; 342/192; 342/196
(58) Field of Search .......................... 342/70, 107, 108, 342/109, 128, 129, 130, 145, 192, 196, 200

(56) References Cited

U.S. PATENT DOCUMENTS

| 6,072,422 A | * | 6/2000 | Yamada ........................ 342/70 |
| 6,249,243 B1 | * | 6/2001 | Takagi .......................... 342/70 |
| 6,317,073 B1 | | 11/2001 | Tamatsu et al. |

FOREIGN PATENT DOCUMENTS

| EP | 0 932 052 A2 | 7/1999 |
| EP | 0 981 059 A2 | 2/2000 |
| JP | 7063842 A | 3/1995 |
| JP | 7-098375 A | 4/1995 |
| JP | 8-211145 A | 8/1996 |
| JP | 2000-65921 | 3/2000 |

* cited by examiner

Primary Examiner—Ian J. Lobo
(74) Attorney, Agent, or Firm—Keating & Bennett, LLP (57) ABSTRACT

In an FM-CW radar system, regarding peaks appearing in the frequency spectrum of a beat signal in an FM-CW radar, groups of consecutive peaks in beam bearings within a predetermined frequency difference are regarded as being caused by reflected waves from a single target, and based on a combination of a peak group in an up-modulating interval and a peak group in a down-modulating interval, a relative distance to a target and its relative speed are determined.

13 Claims, 11 Drawing Sheets

* APPROXIMATE AGREEMENT BETWEEN BEARING ANGLES
APPROXIMATE COINCIDENCE BETWEEN SIGNAL INTENSITIES
POSSIBLE ABSOLUTE-SPEED RANGE

RADAR SYSTEM

BACKGROUND OF THE INVENTION

1. Field of the Invention

The present invention relates to a radar system that detects a target by transmitting and receiving electric waves generated by performing frequency modulation on continuous waves.

2. Description of the Related Art

An FM-CW radar system that detects a target by transmitting and receiving electric waves generated by performing frequency modulation (FM) on continuous waves (CW) transmits a transmitting signal in which a gradually-frequency-rising up-modulating interval and a gradually-frequency-dropping down-modulating interval change temporally repeatedly in a triangular waveform, and receives a reception signal including reflected signals from the target, whereby a relative distance to the target and its relative speed are determined based on the frequency spectrum of a beat signal which is a signal representing a frequency difference between the transmitting signal and the reception signal. Also, by performing the above-described operation for one beam directed to a predetermined direction or bearing, and sequentially changing the beam bearing, detection of targets spread in a predetermined bearing-angle range is performed.

When there is a single target, respectively in both the up-modulating interval and the down-modulating interval, a single peak appears in the frequency spectrum of a beat signal based on reflected waves from the target. Thus, based on a frequency at a peak in the frequency (hereinafter referred to as the "upbeat frequency") of the beat signal in the up-modulating interval and another frequency at another peak in the frequency (hereinafter referred to as the "downbeat frequency") of the beat signal in the down-modulating interval, a relative distance to the target and its relative speed is determined.

Conversely, when there are a plurality of targets in a search range, for a single beam, many peaks appear in a frequency spectrum in both the up-modulating interval and the down-modulating interval. This causes a possibility that an error may occur in pairing a plurality of upbeat frequencies and a plurality of downbeat frequencies.

Accordingly, in Japanese Unexamined Patent Application Publication No. 2000-65921, a radar system is disclosed in which peaks at identical frequencies which appear in frequency spectrum are grouped and those having equal major beam bearings are paired.

In connection therewith, research conducted by the present inventors yielded the discovery of the following problems.

Specifically, appropriate grouping cannot be performed for targets having large relative speeds in a state in which a vehicle having a radar system installed therein travels at a high speed, such as a roadside object and an oncoming vehicle, because the difference between the upbeat frequency and the downbeat frequency is large.

In addition, when there is heavy traffic, or when there are many roadside objects, many groups having equal major beam bearings are detected, so that pairing with good precision is impossible.

Also, peaks at identical frequencies may appear in the frequency spectrum as an upbeat frequency and a downbeat frequency due to effects of noise electric waves coming from the outside of the radar system and noise generated inside the radar system. As a result, a relative distance to an actually nonexistent target and its relative speed are determined and that pairing is affected.

SUMMARY OF THE INVENTION

In order to overcome the problems described above, preferred embodiments of the present invention provide a radar system in which appropriate grouping is performed even for a target having a large relative speed and in which accurate pairing can be performed even if a plurality of objects exist.

Also, preferred embodiments of the present invention provide a radar system in which a problem caused by external noise and in-apparatus noise is eliminated.

According to a preferred embodiment of the present invention, a radar system includes a transmitting/receiving unit for transmitting a transmitting signal changing in a triangular waveform so that a frequency-gradually-rising up-modulating interval and a frequency-gradually-dropping down-modulating interval are temporally repeated and for receiving a reception signal including a reflected signal from a target, a scanning unit for changing the beam bearing of the transmitting signal for predetermined bearing angles, a frequency-analyzing unit for finding data on the frequency spectrum of a beat signal representing a frequency difference between the transmitting signal and the reception signal, a detecting unit for detecting, based on the frequency of the beat signal in the up-modulating interval and the frequency of the beat signal in the down-modulating interval, at least one of a relative distance to the target and a relative speed thereof, and a checking unit in which, peak groups each including consecutive peaks appearing in the frequency spectrum in the beam bearings within a predetermined frequency difference are regarded as being caused by waves reflected by a single target, and the unit performs checking, in pairs, of each peak group in the up-modulating interval and each peak group in the down-modulating interval.

As described above, groups of consecutive peaks in the beam bearings within a predetermined frequency difference are regarded as being caused by reflected waves from a single target, whereby appropriate grouping can be performed even for a target having a large relative speed. In addition, even if there are many objects, one peak group can be detected for one target, thus preventing a pairing error from occurring.

Preferably, the checking is performed only on each group in which the number of the peaks which are consecutive in the beam bearings is a predetermined number or greater.

This prevents noise components having a short duration, such as random noise, from being mistakenly extracted as peak groups.

A peak group in which the peaks consecutively appear in all of the beam bearings and the signal intensity of the peaks may be substantially constant are regarded as a specific group, and the checking may be performed excluding the specific group.

This prevents a signal component other than a beat frequency caused by reflected waves from the actual target from being used for checking. This prevents a pairing error from occurring.

When the specific group appears in both the up-modulating interval and the down-modulating interval, the specific group may be excluded.

When the specific group repeatedly appears in accordance with the repetition of changing of beam bearings, the specific group may be excluded.

The scanning unit can change the speed of changing the beam bearing, and/or the transmitting/receiving unit can change the speed of repeating the up-modulating interval and the down-modulating interval, and when the frequency of the specific group is substantially constant despite a change in the speed of changing the beam bearing or a change in the speed of repeating the up-modulating interval and the down-modulating interval, the specific group may be excluded.

As described above, by excluding a continuously appearing noise component, an undesired influence on pairing is prevented.

Among the peak groups, the checking may be performed on two peak groups having substantially equal central bearings.

This facilitates checking for many targets, even if they are spread out in beam bearings.

Among the peak groups, the checking may be performed on two peak groups having substantially equal signal intensities. This ensures checking for peak groups caused by a single target.

The radar system may be installed in a movable object and preferably includes unit for capturing information on the movement speed of the movable object, and a possible frequency range generated by combining the peak in the up-modulating interval and the peak in the down-modulating interval may be set based on the movement speed, and the checking is performed for the frequency range.

As described above, by limiting the number of ones to be checked by avoiding normally impossible combinations of relative distances and relative speeds, the time required for the checking is shortened, and many targets can simultaneously be captured. In addition, a possibility of mis-pairing occurring is minimized.

Also, correlations between the signal-intensity profiles in the bearings of the peak groups may be determined, and the checking may be performed so that a higher priority is given to a peak group having a higher correlation.

This increases precision of pairing of peak groups caused by a single target.

Also, according to preferred embodiments of the present invention, a possible frequency range generated by combining the peak in the up-modulating interval and the peak in the down-modulating interval is set based on the movement speed of a movable object having a radar system installed therein, and the checking is performed for the frequency range, whereby the time required for the checking is shortened, and many targets can simultaneously be captured. In addition, a possibility of mis-pairing occurring is minimized.

Other features, elements, characteristics and advantages of the present invention will become more apparent from the following detailed description of preferred embodiments thereof with reference to the attached drawings.

DETAILED DESCRIPTION OF PREFERRED EMBODIMENTS

The structure of a radar system according to a preferred embodiment of the present invention is described with reference to the accompanying drawings.

Figure 1:
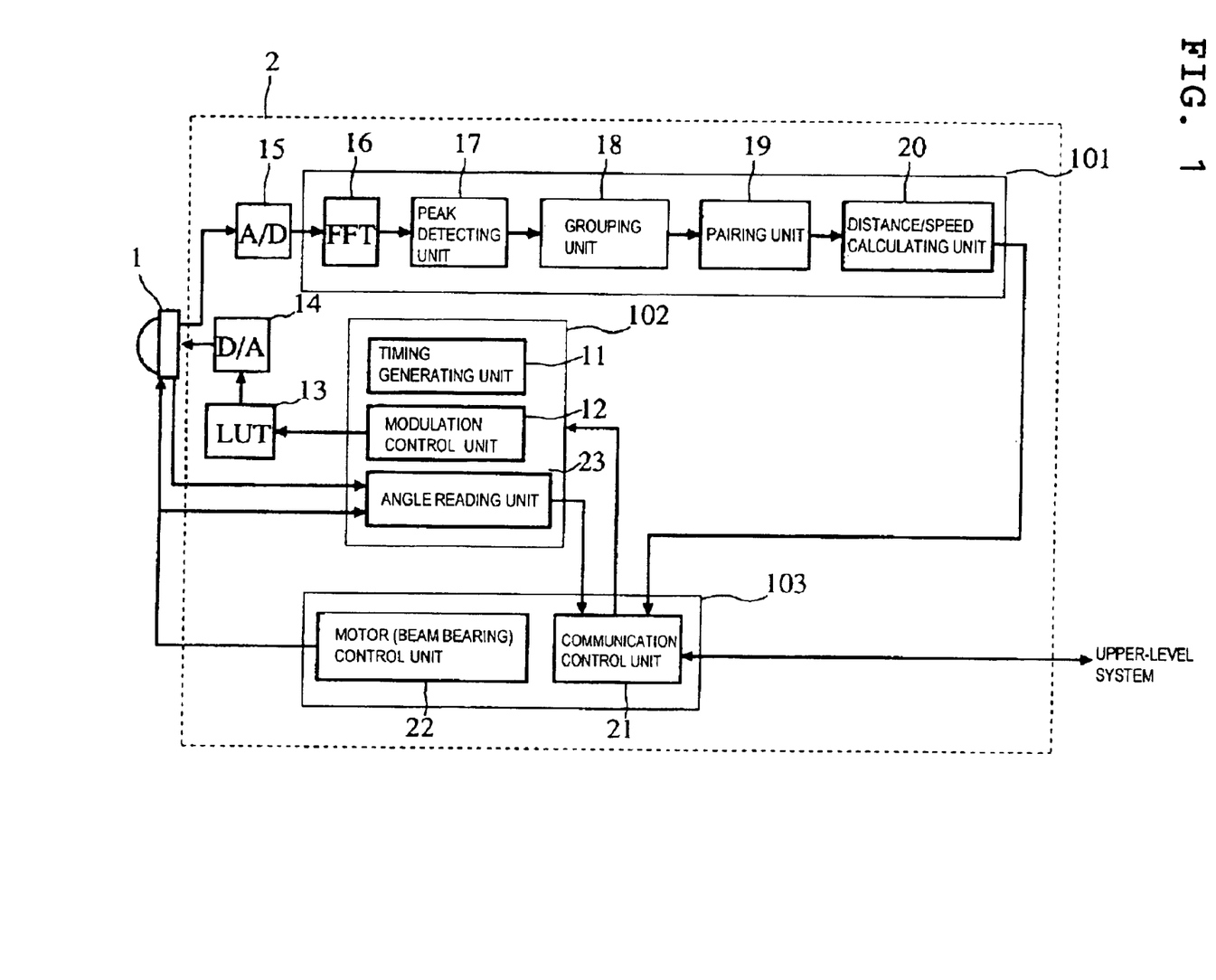
FIG. 1 is a block diagram showing the structure of a radar system.

FIG. 1 is a block diagram showing the structure of a radar system. In FIG. 1, a front end 1 transmits and receives milliwave signals, and a radar controller 2 is connected to the front end 1. In the radar controller 2, a portion 101 is a signal processing unit for a beat signal, and a portion 102 is a control unit that modulates a transmitting signal and detects a beam bearing, and a portion 103 performs beam scanning and communication control. A timing generating unit 11 generates a timing signal for modulating a transmitting signal. In synchronization with the timing signal, a modulation control unit 12 outputs, to a look-up table (LUT) 13, control data (values) for transmitting a milliwave signal at the transmitting frequency required at each temporal point. In the LUT 13, the relationship of an input value to an output value is provided in a table form beforehand. A digital-to-analog (D/A) converter 14 supplies the front end 1 with an analog voltage signal in accordance with a value output from the LUT 13. The front end 1 includes a voltage-controlled oscillator (VCO). The front end 1 is supplied as an input control voltage for the VCO with a voltage output from the D/A converter 14, and transmits a milliwave signal having a frequency in accordance with the voltage.

The front end 1 includes a mixing circuit that outputs a beat signal generated by mixing a local signal extracted by performing coupling on the transmitting signal with a reception signal. An analog-to-digital (A/D) converter 15 samples the beam signal for each predetermined sampling period and converts the beat signal into digital data strings or data rows. The signal processing unit 101 includes a digital signal processor (DSP), and the signal processing in the signal processing unit 101 is mainly summation calculation and is performed by program processing.

An FFT (Fast Fourier Transformation) processor 16 finds a signal-intensity-representing frequency spectrum for each of the discrete frequencies by performing high-speed Fourier transformation on a number of input portions of predetermined sampling data. For example, a power spectrum is determined.

A peak detecting unit 17 detects the peak frequency of a peak in a signal intensity appearing in the frequency spectrum and the signal intensity of the peak frequency. A grouping unit 18 extracts, as a peak group, a group of peaks appearing in the frequency spectrum and lining up within a predetermined frequency difference consecutively in beam bearings.

A pairing unit 19 checks pairs of a plurality of peak groups in an up-modulating interval and a plurality of peak groups in a down-modulating interval, and determines a combination of peak groups caused by a single target.

A distance/speed calculating unit 20 calculates, for the paired groups of peak groups, a relative distance to the target causing the peak groups and its speed based on a peak frequency in the up-modulating interval and a peak frequency in the down-modulating interval.

A motor (beam bearing) control unit 22 supplies the front end 1 with beam-bearing control data. The front end 1 includes a motor for changing a beam bearing, and directs a beam in a bearing designated based on the control data from the motor (beam bearing) control unit 22. Also, the front end 1 includes a unit for outputting a signal for detecting the beam bearing, and an angle reading unit 23 determines the present beam bearing by reading the signal.

A communication control unit 21 outputs, to an upper-level system (host apparatus), data of a relative distance to each target and its relative speed in the beam bearing. The communication control unit 21 receives control data from the upper-level system and supplies the data to a modulation/beam-bearing detecting unit 102. For example, the setting of a changing speed of the beam bearing, the speed of repeating the up-modulating interval and the down-modulating interval, and other processes, are performed.

In addition, the upper-level system includes a unit for measuring the movement speed of a movable object provided with this radar system. The communication control unit 21 reads information concerning the movement speed.

Figure 2:
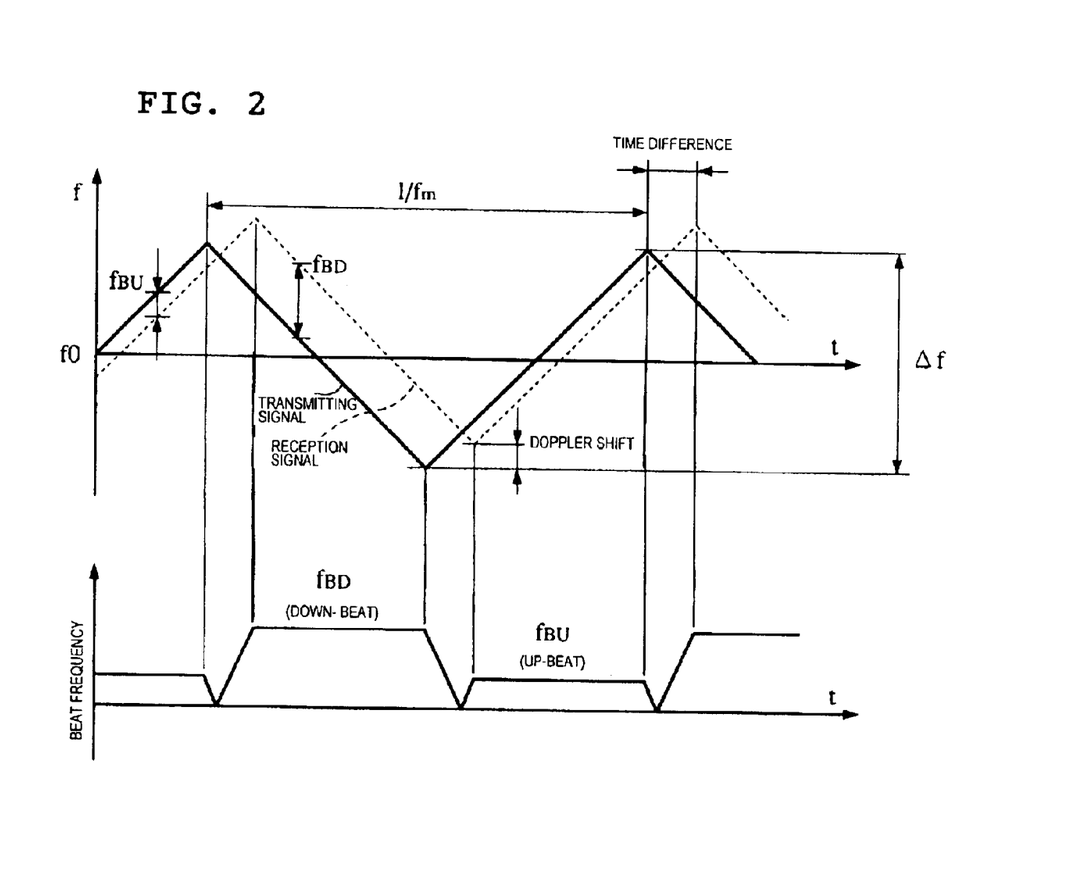
FIG. 2 is an illustration of a change in frequency between a transmitting signal and a reception signal which are changed by a relative distance and relative speed with respect to a target.

FIG. 2 shows an example of a shift, caused by the distance to a target and its relative speed, of a frequency change in a transmitting signal and a reception signal. A frequency difference between the transmitting signal and the reception signal in a frequency rising mode of the transmitting signal is an upbeat frequency $f_{BU}$, and a frequency difference between the transmitting signal and the reception signal in a frequency dropping mode of the transmitting signal is a downbeat frequency $f_{BD}$. A shift (time difference) in time domain between the transmitting signal and the reception signal corresponds to round-trip time of electromagnetic waves from an antenna to the target. A shift in frequency between the transmitting signal and the reception signal is a Doppler shift, and this is caused by the relative speed of the target to the antenna. The time difference and the Doppler shift change the values of the upbeat $f_{BU}$ and the downbeat $f_{BD}$. In other words, by detecting the frequencies of the upbeat and the downbeat, the distance from the radar system to the target and the relative speed of the target to the radar system are calculated.

Figure 3:
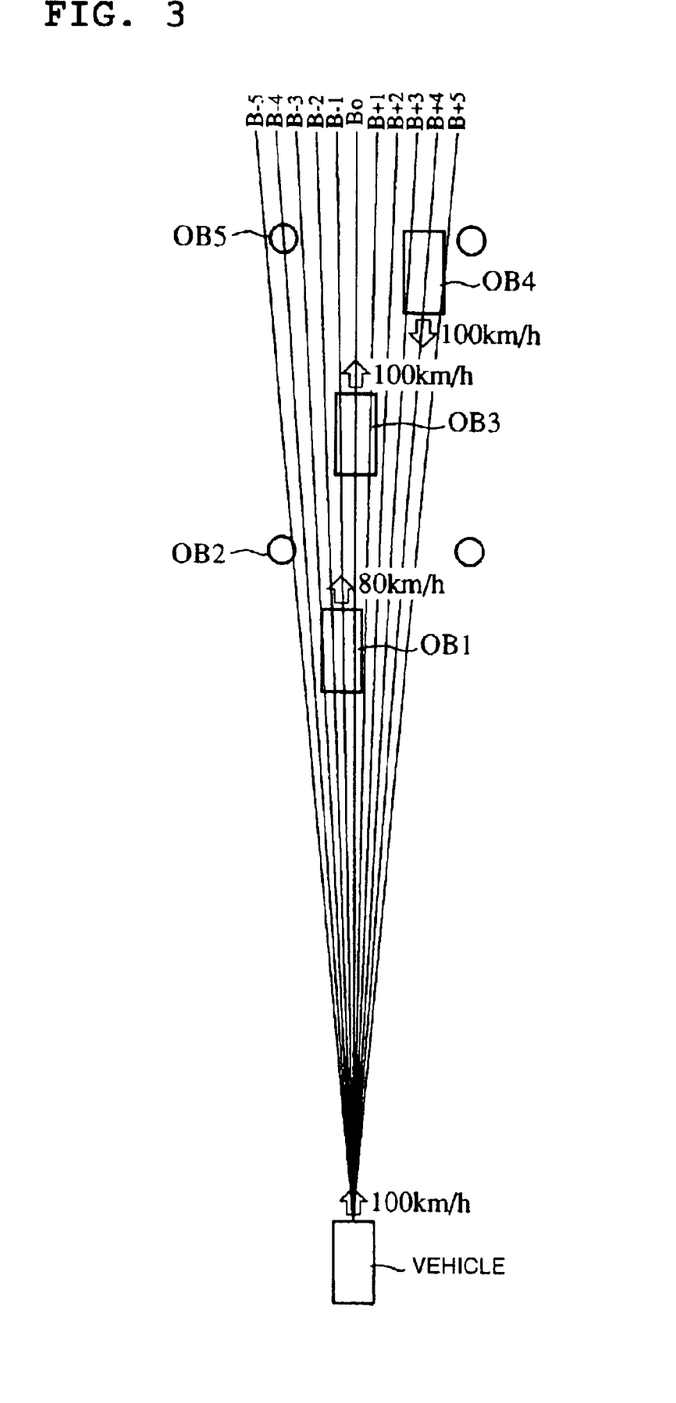
FIG. 3 is an illustration of the relationship between beams and a target in a search range.

FIG. 3 shows an example of the relationship between the bearings of the radar system's transmitting and received beams and a plurality of targets, where Bo denotes the front direction of the radar system when it is installed on a vehicle. B+1, B+2 . . . denote beam bearings obtained when the beam bearing is changed from the front to the right. Similarly, B−1, B−2, . . . denote beam bearings obtained when the beam bearing is changed from the front to the left.

In FIG. 3, the circle targets OB2 and OB5 indicate fixed roadside objects. Also, the rectangular targets OB1, OB3, and OB4 indicate other vehicles existing ahead of the vehicle. The arrows indicate the traveling directions of the targets.

Figure 4:
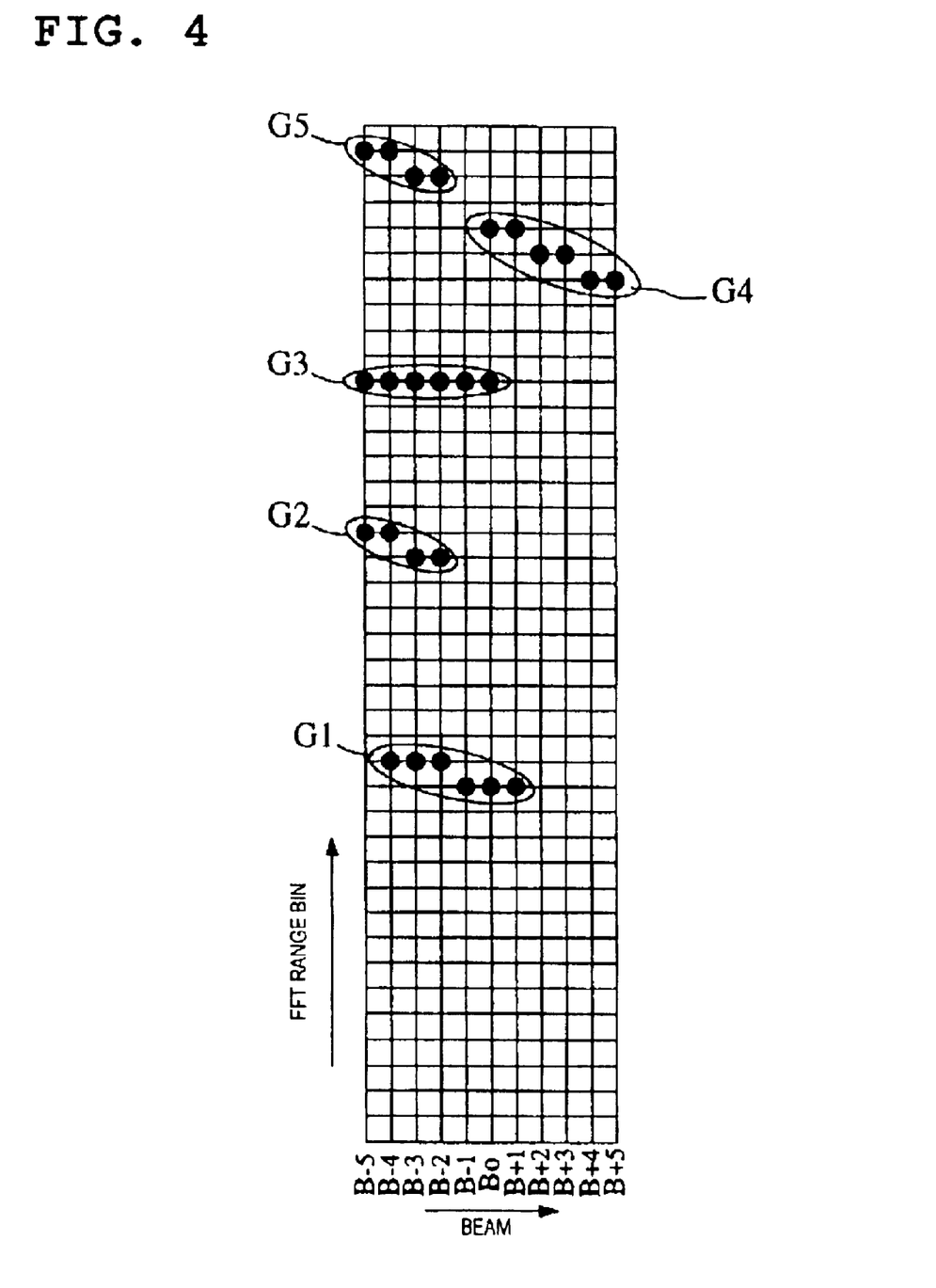
FIG. 4 is an illustration of an example of peak frequency spectra for beam bearings.

FIG. 4 is a rectangular coordinates illustration showing peak frequencies in the peaks of up-modulating intervals of different directional beams, where the horizontal axis indicates beam bearings, and the vertical axis indicates the peak frequencies in the peaks included in the frequency spectrum. In FIG. 4, peak groups G1 to G5 having consecutive peak frequencies are caused by targets OB1 to OB5 shown in FIG. 3. In every group, peak frequencies in the peaks in the frequency spectrum line up in the beam bearings. For example, the positions of peaks in the frequency spectrum which are caused by the target OB1 traveling ahead of the vehicle at a speed that is lower than that of the vehicle consecutively appear within a predetermined frequency difference in six beams B−4 to B+1. Also, the peak frequencies caused by the object OB2 as a roadside object appear in four beams B−5 to B−2.

As described above, by sequentially linking peak frequencies arranged in a predetermined frequency range on adjacent beams, the peak frequencies are grouped as each peak group.

By way of example, when a signal having a beam width of about 3.0 degrees is emitted in units of about 0.5 degrees, approximately seven beams are observed as reception signals generated by reflection by one target. Accordingly, seven adjacent beams have peak frequencies caused by one target. By treating the peak frequencies as a peak group (hereinafter referred to simply as a "group"), an increase in pairing precision is achieved. In addition, simultaneously with that, the amount of data to be treated can be reduced. In data representing the group formed by the grouping, the central bearing of consecutive bearings spread in beam bearings is treated as the typical bearing of the group, the central frequency of peak frequencies is treated as the typical frequency of the group, and the average or maximum of signal intensity is treated as the typical signal intensity of the group.

A frequency range to be used for grouping of peak frequencies on adjacent beams may be frequencies corresponding to a distance in which a target can move in a scanning time (the time taken for scanning from one beam to an adjacent beam) for one beam. However, since discrete frequencies are used, only a frequency range corresponding to one FFT range bin can be widely set. This enables grouping to be adapted for a relative distance change in beam scanning of the object. For example, when a beam scanning time for a predetermined search range is set to about 0.1 second, and the number of beams formed in the search range is set to about 40, a distance in which a target having a relative speed of about 400 km/h moves during emission of one beam is expressed by:

$$0.1\ [s]/40\ [beams]*400\ [km/h]*1000\ [m]/3600\ [s]=0.28\ [m].$$

Therefore, while the target is captured by six beams, the target moves by about 0.28 [m]×6 [beams]=1.68 [m]. If the distance corresponding to one FFT range bin (interval of discrete frequencies by FFT) is about 0.5 meters, the peak frequency can move in three to four range bins during the time of the six beams.

After finding the peak frequency in a peak of the frequency spectrum, the frequency spectrum data is unnecessary. Also, after performing grouping, the typical bearing and typical signal intensity of the group are only used in pairing. Thus, after the grouping, data of peak frequencies and signal intensities for beams are also unnecessary. This eliminates the need for a large memory capacity, and can reduce a data processing amount.

Figure 5A:
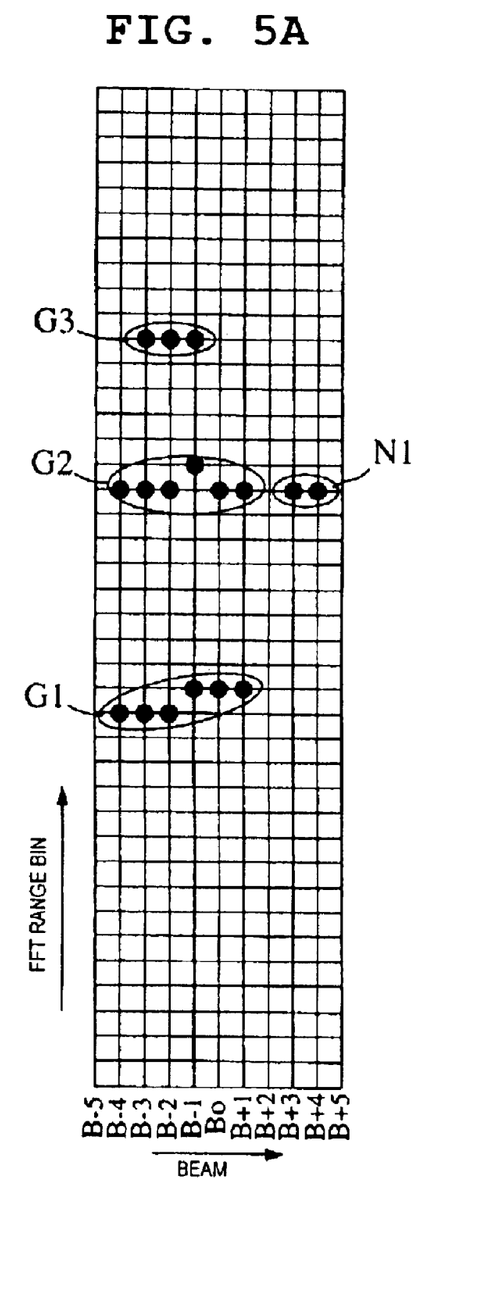
FIGS. 5A and 5B are illustrations of an example in which a noise component is eliminated in the peak frequency spectra for beam bearings.
Figure 5B:
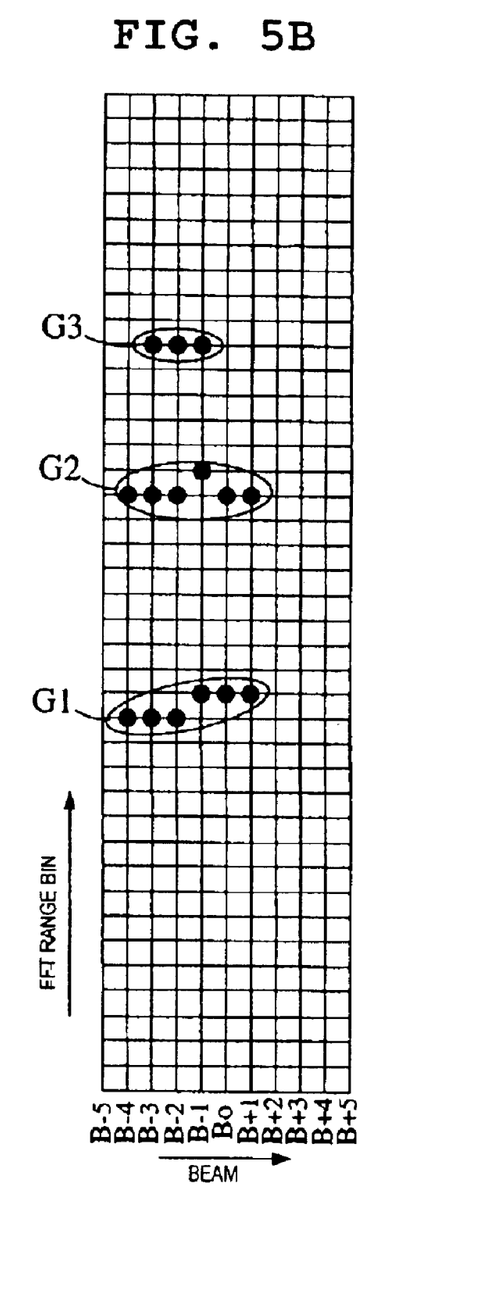

FIGS. 5A and 5B show treatment of apparent peak groups generated by effects of noise. In the example in FIG. 5A, groups denoted by G1 to G3 and N1 are detected, and in the group denoted by N1, only two beams have peak frequencies.

As described above, reception signals reflected by one target should form a group spread in directions corresponding to angles for beam widths, even if the beam-bearing width is narrow. Therefore, a group bearing width that is narrower than the range is regarded as a group bearing width that is not formed by reflection off of an actual target. The group N1 shown in FIG. 5A is treated as an apparently specific group generated by noise. In other words, as shown in FIG. 5B, the groups G1, G2, and G3 are used for pairing which is described later.

For example, the width in bearing of a beam which is detected by the side lobe of the antenna is half as large as the width in bearing of the beam which is detected by the main lobe. Accordingly, when reflected waves from the target are received, a group which has a smaller number of beams in the beam bearings is formed, such as the group N1 shown in FIG. 5A. By excluding the influence of the side lobe, target-bearing misdetection is prevented from occurring and an increase in pairing precision is achieved.

Figure 6A:
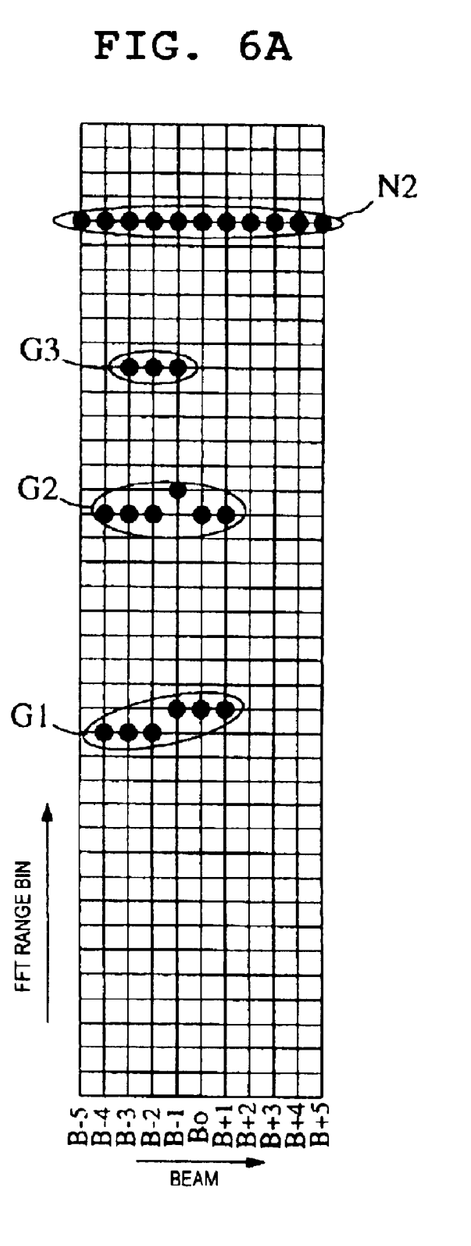
FIGS. 6A and 6B are illustrations of an example in which a noise component is eliminated in the peak frequency spectra for beam bearings.
Figure 6B:
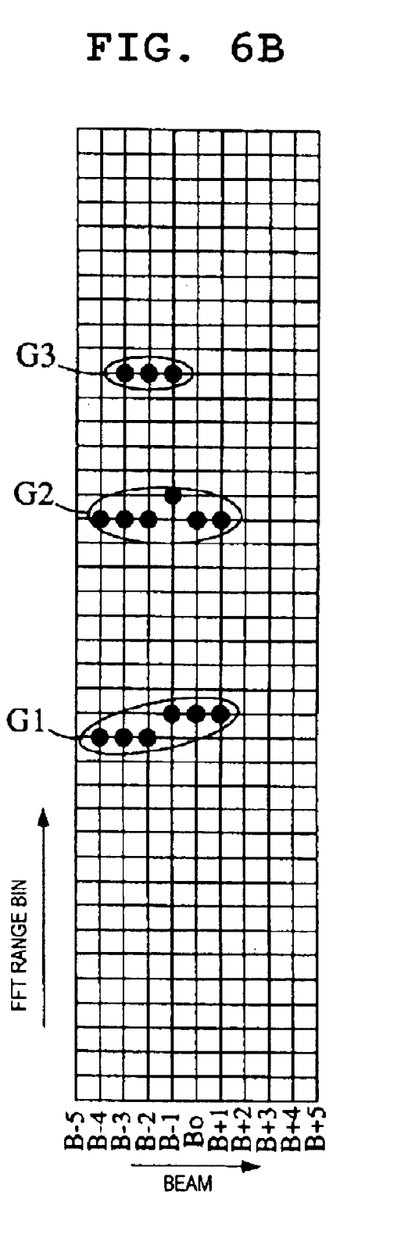

FIGS. 6A and 6B are illustrations of treatment of other noise components. In this example, conversely, a group having such long consecutive peaks in beam bearings are not found in the case of an actual target is regarded as a specific group and is excluded.

For example, a signal component in which, if a factor of a difference in signal intensity which is caused by antenna characteristics or other factors, is eliminated, peaks appear at almost identical signal intensities in all the bearings of a search range can be regarded as a constantly existing noise component.

However, in a case in which there is a wall or other such object located just in front of the radar, a group having consecutive peaks in all bearings is formed. Accordingly, in order that this may not be regarded as a specific group, when peaks at identical frequencies and identical signal intensities are observed in both the up-modulating interval and the down-modulating interval, it may be determined that the peaks form a specific group. Also, a pair of an up-modulating interval and a down-modulating interval is used as a frame, and this is repeatedly performed for a plurality of frames for modulation on a transmitting signal. When peaks at identical frequencies and identical signal intensities are observed in consecutive frames, it may be determined that the peaks form a specific group.

In addition, in a case in which a beam-bearing changing speed or a speed of repeating the frames is changed, when peaks at identical frequencies and identical signal intensities are observed in all bearings between different beam-bearing changing speeds or between different frame-repeating speeds, the peaks may be regarded as a specific group and may be excluded.

Next, some pairing methods are sequentially described below.

Pairing is performed to determine a combination of peak groups which are caused by a single target and which appear in an up-modulating interval and a down-modulating interval. The combination is determined by using features of the peak groups caused by the single target.

Figure 7A:
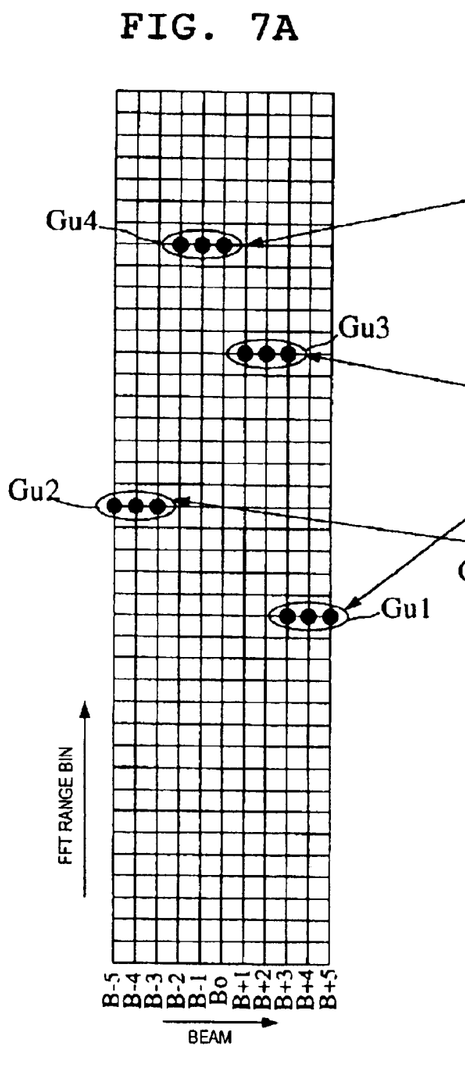
FIGS. 7A and 7B provide illustrations of an example of pairing based on agreement between bearings from peak frequency spectra in an up-modulating interval and a down-modulating interval.
Figure 7B:
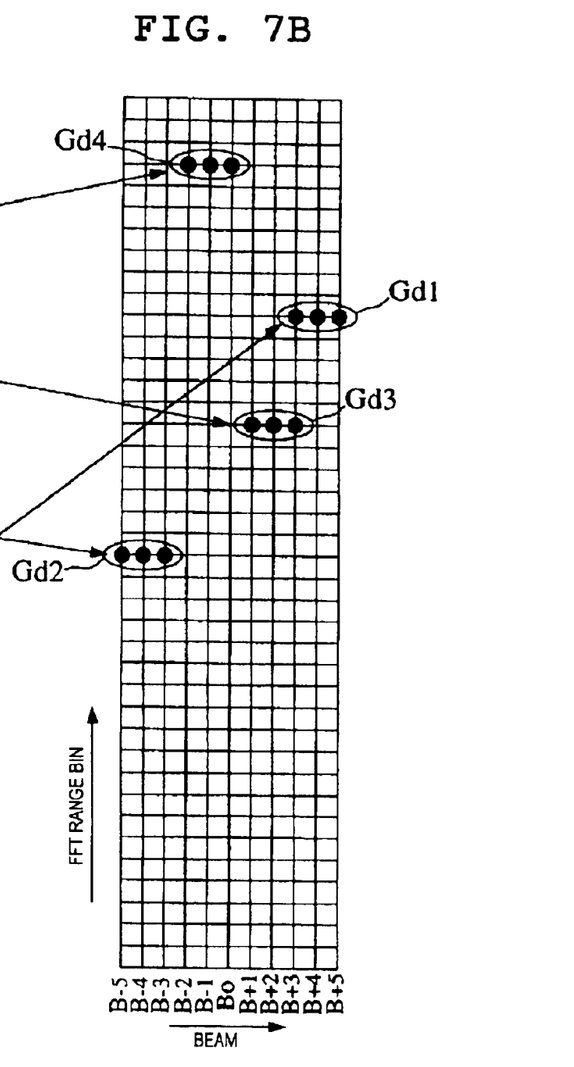

One of the features of preferred embodiments of the present invention is a central bearing in each group. FIGS. 7A and 7B show pairing of groups having equal central bearings. FIG. 7A shows peak groups in the up-modulating interval, and FIG. 7B shows peak groups in the down-modulating interval. As just described, two groups having almost equal typical bearings are paired. For example, from the typical frequency of a group Gu1 in the up-modulating interval and the central frequency of a group Gd1 in the down-modulating interval, a relative distance and relative speed with respect to a target forming the groups are calculated. This similarly applies to the other groups.

Figure 8A:
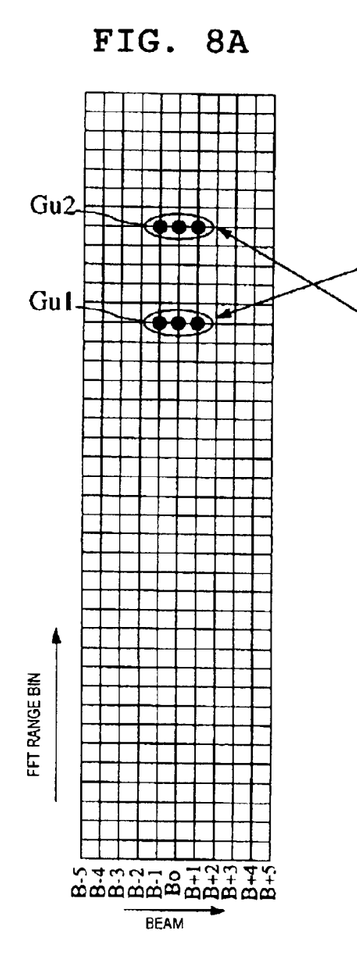
FIGS. 8A, 8B, 8C and 8D provide illustrations of an example of pairing based on coincidence between signal intensities from peak frequency spectra in an up-modulating interval and a down-modulating interval.
Figure 8B:
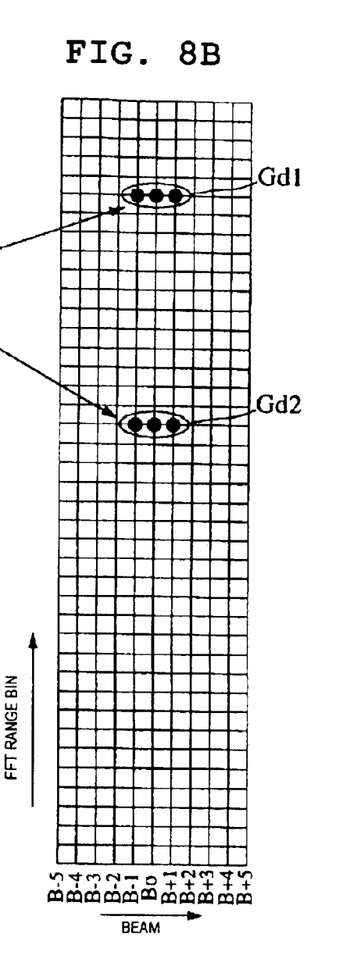

FIGS. 8A and 8B show an example of pairing by using a feature in which the signal intensities of groups caused by a single target are almost equal between the up-modulating interval and the down-modulating interval. In the example in FIGS. 8A and 8B, there are groups Gu1 and Gu2 in almost identical bearings in the up-modulating interval, while there are groups Gd1 and Gd2 in almost identical bearings in the down modulating interval. When the signal intensities of the groups Gu1 and Gd1 are almost equal to each other, and the signal intensities of the groups Gu2 and Gd2 are almost equal to each other, the groups Gu1 and Gd1 are paired and the groups Gu2 and Gd2 are paired.

Figure 8C:
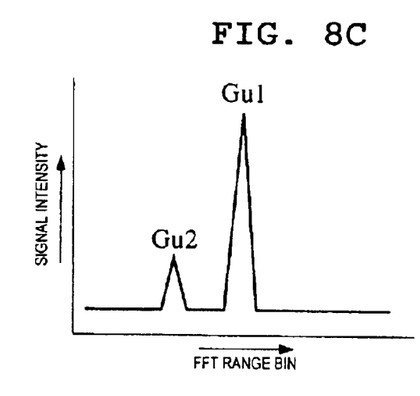
Figure 8D:
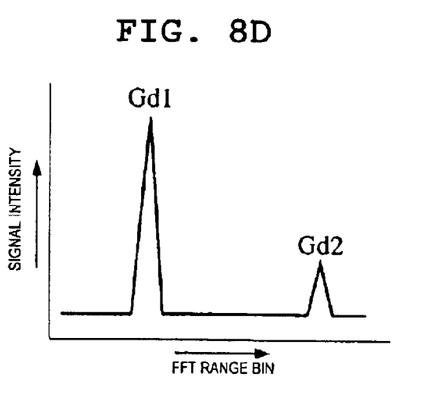

FIG. 8C shows the signal intensities of two groups in the up-modulating interval, and FIG. 8D shows the signal intensities of two groups in the down-modulating interval. Here, the horizontal axis indicates a frequency, and the vertical axis indicates signal intensity.

Figure 9A:
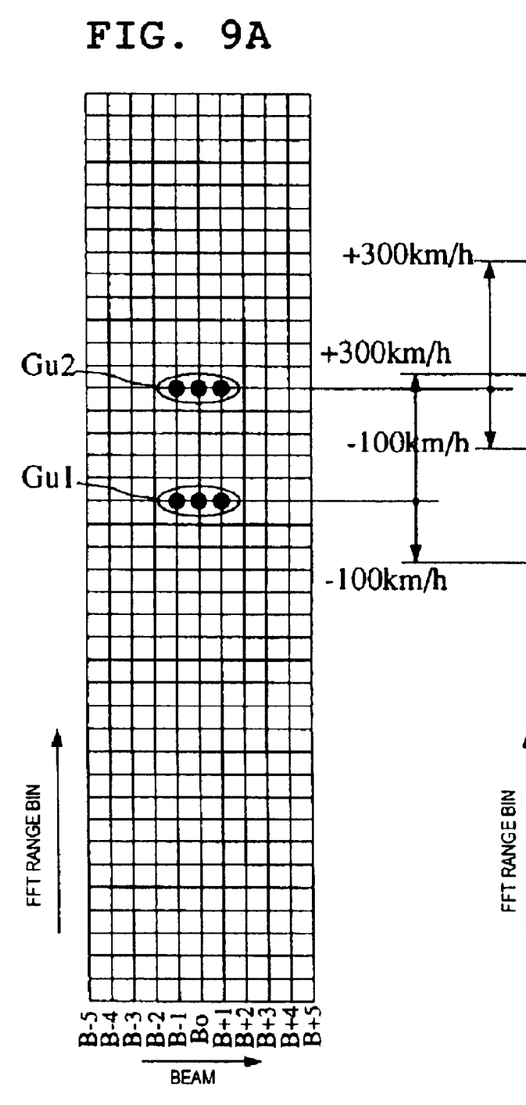
FIGS. 9A and 9B provide illustrations of an example of pairing based on a probability of a relative speed from peak frequency spectra in an up-modulating interval and a down-modulating interval.
Figure 9B:
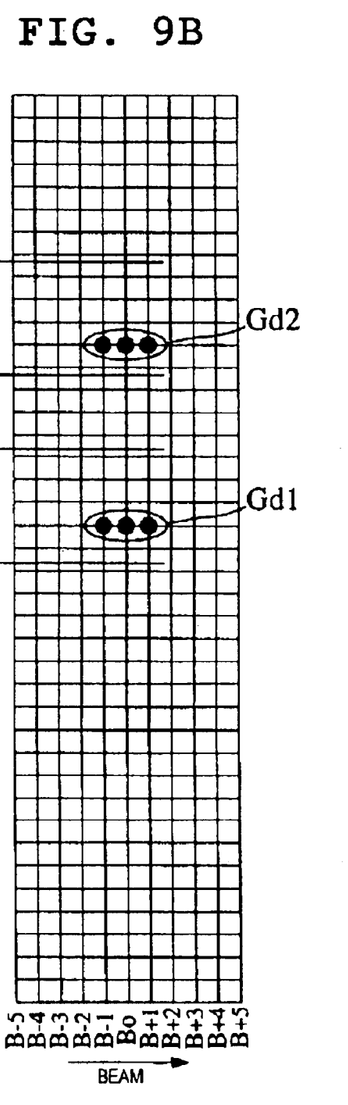

FIGS. 9A and 9B show an example of pairing of those in which the results of calculating relative speeds are within a possible target-relative-speed range. The difference between the frequency of a group detected in the up-modulating interval and the frequency of a group detected in the down-modulating interval is proportional to the relative speed of the target. For example, when the traveling speed of the vehicle is about 100 km/h, and the absolute speed of the target is about 200 km/h or less, the relative speed of a target is about −100 km/h to about +300 km/h. In other words, when the target travels at about 200 km/h ahead of the vehicle in its direction, the relative speed is about −100 km/h. Also, when the target reversely travels toward the vehicle at about 200 km/h, the relative speed is about +300 km/h. Accordingly, those in which the difference in frequency between the up-modulating interval and the down-modulating interval is within the above-described range are paired. In the example in FIG. 9, the groups Gu1 and Gd1 are paired, and the groups Gu2 and Gd2 are paired.

Figure 10A:
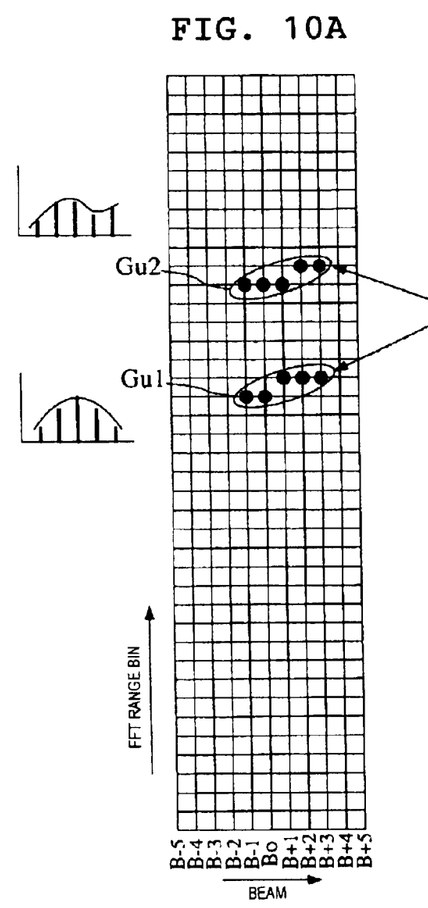
FIGS. 10A and 10B provide illustrations of an example of pairing based on agreement between signal-intensity profiles in bearings from peak frequency spectra in an up-modulating interval and a down-modulating interval.
Figure 10B:
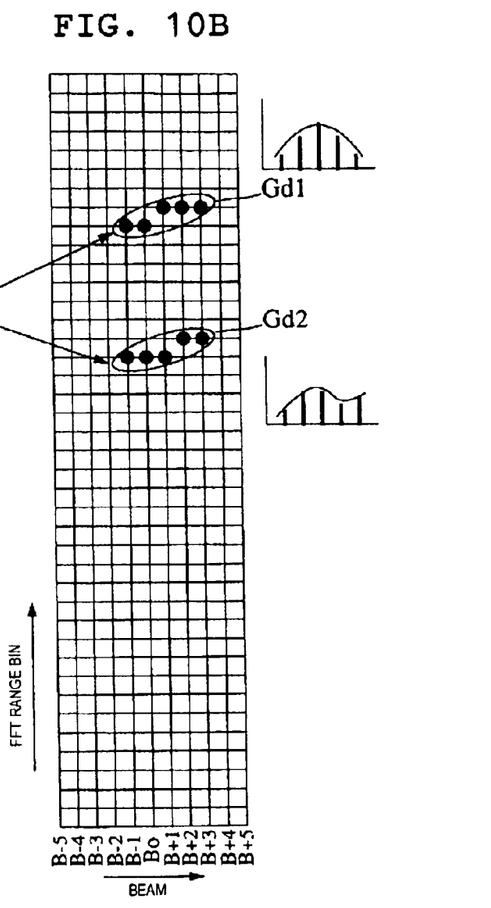

FIGS. 10A and 10B show an example of pairing based on the similarities of signal-intensity profiles in the beam bearings of peak groups. A change in the signal-reflected position of the target is determined based on the shape and material of a reflection surface of the target. Thus, in the groups caused by the single target, a change in signal intensity in the beam bearing is similar in the up-modulating interval and the down-modulating interval.

FIGS. 10A and 10B show examples of the signal intensity profiles in beam bearings of two groups in the up-modulating interval and the down-modulating interval. Since groups Gu1 and Gd1 are similar to each other in signal intensity profile, this set is used as a pair. Similarly, since groups Gu2 and Gd2 are similar to each other in signal intensity profile, this set is used as a pair.

In order that the similarity determination may be numerically performed, a relative coefficient between the signal intensity profiles is calculated, and those in which in the value is larger are paired at higher priority.

Figure 11:
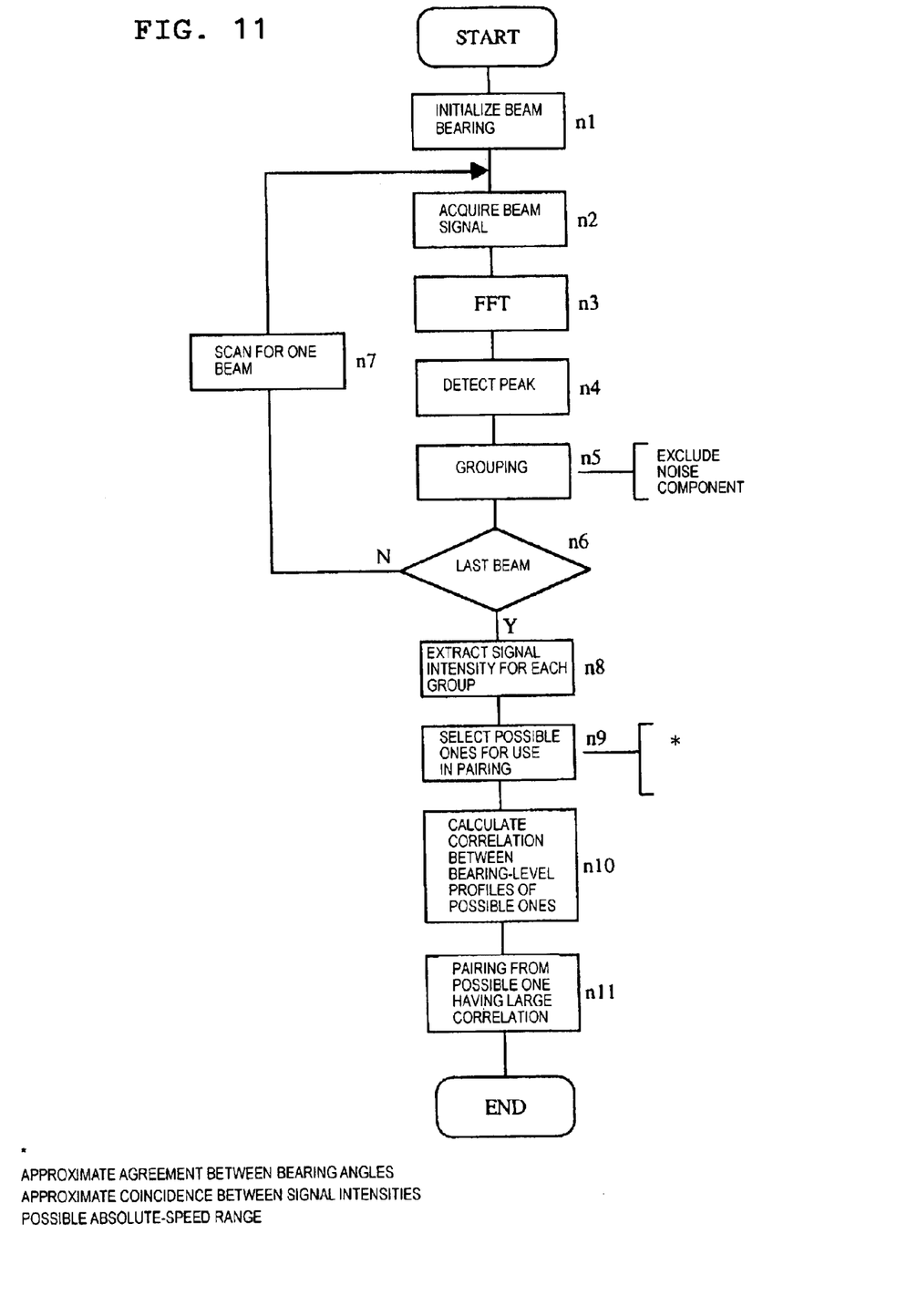
FIG. 11 is a flowchart showing a process of a radar controller.

A process of the radar controller 2 shown in FIG. 1 which includes the above grouping and pairing is shown in a flowchart in FIG. 11. First, the motor (beam bearing) control unit 22 controls the beam to be directed to an initial bearing (n1). In this state, portions of beat-signal digital data generated by conversion by the A/D converter 15 are obtained as many as a predetermined number of times that sampling is performed, and are FFT-processed (n2→n3).

Subsequently, peak detection is performed (n4). Specifically, a portion at which the signal intensity of the frequency spectrum peaks in a pointed form is detected, and the peak frequency and signal intensity at the peak frequency are extracted.

Subsequently, by referring to the extracted peak frequency and signal intensity in the previous beam bearing, it is determined to which group a peak frequency and its signal intensity in the present beam bearing are assigned (n5). In other words, those in which a frequency difference between peak frequencies is a constant frequency or less are grouped. At this time, noise components as shown in FIGS. 5 and 6 are excluded.

After that, the beam bearing is displaced by one beam, similar processing is repeated (n6→n7→n2→ . . . ).

By repeatedly performing the above processing up to the last beam, in a search range having a predetermined width in bearings, a peak frequency spectrum for each beam bearing in the up-modulating interval and the down-modulating interval, as shown in FIGS. 7A and 7B, is determined.

Subsequently, the signal intensity of each group is extracted (n8). For example, a signal intensity at the peak frequency in the center of beam bearings is used as a typical signal intensity of the group.

After that, from typical signal intensities of groups in the up-modulating interval and the down-modulating interval, possible intensities are selected (n9). Here, approximate agreement between bearing angles, approximate coincidence between signal intensities, and a frequency difference being within a range corresponding to a possible absolute-speed range are used as selection conditions for those to be paired.

After that, a mutual relative coefficient in a bearing level profile between the selected groups are found (n10), and those having larger relative coefficients are sequentially paired (n11).

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A radar system comprising:
   a transmitting/receiving unit for transmitting a transmitting signal changing in a triangular waveform so that a frequency-gradually-rising up-modulating interval and a frequency-gradually-dropping down-modulating interval are temporally repeated and for receiving a reception signal including a reflected signal from a target;
   a scanning unit for changing the beam bearing of the transmitting signal for predetermined bearing angles;
   a frequency-analyzing unit for determining data on the frequency spectrum of a beat signal representing a frequency difference between the transmitting signal and the reception signal;
   a detection unit for detecting, based on the frequency of the beat signal in the up-modulating interval and the frequency of the beat signal in the down-modulating interval, at least one of a relative distance to the target and a relative speed thereof; and
   a checking unit in which, peak groups each including consecutive peaks appearing in the frequency spectrum in the beam bearings within a predetermined frequency difference are regarded as being caused by waves reflected by a single target, and said checking unit performs checking, in pairs, of each peak group in the up-modulating interval and each peak group in the down-modulating interval; wherein
   the predetermined frequency difference corresponds to a distance in which the single target can move in a scanning time for one beam.

2. A radar system according to claim 1, wherein the checking unit performs checking only on each group in which the number of the peaks which are consecutive in the beam bearings is a predetermined number or greater.

3. A radar system according to claim 1, wherein a peak group in which the peaks consecutively appear in all of the beam bearings and the signal intensity of the peaks is substantially constant are regarded as a specific group, and the checking is performed excluding the specific group.

4. A radar system according to claim 3, wherein, when the specific group appears in both of the up-modulating interval and the down-modulating interval, the specific group is excluded.

5. A radar according to claim 3, wherein, when the specific group repeatedly appears in accordance with the repetition of both modulating intervals, the specific group is excluded.

6. A radar system according to claim 3, wherein said scanning unit is arranged to change the speed of changing the beam bearing, and when the frequency of the specific group is substantially constant despite a change in the speed of changing the beam bearing, the specific group is excluded.

7. A radar system according to claim 3, wherein said scanning unit is arranged to change the speed of changing the beam bearing and when the frequency of the specific group is substantially constant despite a change in the speed of repeating the up-modulating interval and the down-modulating interval, the specific group is excluded.

8. A radar system according to claim 3, wherein said transmitting/receiving unit is arranged to change the speed of repeating the up-modulating interval and the down-modulating interval, and when the frequency of the specific group is substantially constant despite a change in the speed of changing the beam bearing, the specific group is excluded.

9. A radar system according to claim 3, wherein said transmitting/receiving unit is arranged to change the speed of repeating the up-modulating interval and the down-modulating interval, and when the frequency of the specific group is substantially constant despite a change in the speed of repeating the up-modulating interval and the down-modulating interval, the specific group is excluded.

10. A radar system according to one of claim 1, wherein, among the peak groups, the checking unit performs checking on two peak groups having substantially equal central bearings.

11. A radar system according to claim 1, wherein, among the peak groups, the checking is performed on two peak groups having substantially equal signal intensities.

12. A radar system according to claim 1, wherein said radar system is installed in a movable object and includes a unit for capturing information on the movement speed of the movable object, end a possible frequency range generated by combining the peak in the up-modulating interval and the peak in the down-modulating interval is set based on the movement speed, and the checking is performed for the frequency range.

13. A radar system according to claim 1, wherein correlations between the signal-intensity profiles in the bearings of the peak groups are determined, and the checking is performed so that higher priority is given to a peak group having a higher correlation.

* * * * *